Patented Mar. 4, 1930

1,749,651

UNITED STATES PATENT OFFICE

EDWIN C. WALLACE, OF NEWTON, MASSACHUSETTS

METHOD OF PREPARING BITUMINOUS PAVING COMPOSITIONS

No Drawing.  Application filed June 8, 1928.  Serial No. 284,017.

Modern practice in road construction recognizes two distinct types of bituminous paving mixtures generally referred to as coarse or fine aggregate type according to the maximum size of the mineral particles used in the aggregate.

In the fine aggregate type substantially all of it will pass a screen of 10 meshes per linear inch, but in the coarse aggregate type particles of 1/4" and larger, frequently as large as 1 1/2" predominate. The coarse particles may consist of gravel, crushed or broken stone, slag or material of like nature or a mixture of any or all of them. The fine material usually consists of sand or fine stone screenings or a combination of the two in various proportions.

Whatever the maximum size of the particles used, smaller particles are required to fill in between them and reduce the size of the interstices as much as possible to prevent absorption of water.

This is best accomplished by grading the aggregate and adding a certain proportion of very finely divided mineral matter or dust, technically known as "filler", which fits in the very small spaces between the smaller particles of the aggregate. Substantially all of the filler should pass a 50 mesh sieve and 60% or more should pass a 200 mesh sieve.

The amount of very finely divided filler required obviously depends upon the number of very small spaces. In fine aggregate mixtures the number of such small spaces is vastly greater than in coarse aggregate mixtures as in the latter case the spaces between the larger particles may be filled with sand particles equal in size to the maximum size particles used in the fine aggregate compositions.

In both classes of mixture there is considerable variation in the actual size of the particles which compose the aggregate, but in the fine aggregate the extremes of variation are much less than in coarse composition.

Owing to its physical properties the proportion of cementing medium which can be used to advantage with any aggregate is limited, but since it forms the only bond of union between the mineral particles it is essential that it be used in sufficient quantity and in a manner most efficient to serve that purpose.

Fine aggregate mixtures "carry" more bituminous cement than coarse aggregate compositions because the surface to be coated is greatly increased by the vastly greater number of the particles to be bound together.

Although the beneficial effect of dust or filler has long been recognized, there is great diversity of opinion as to the proper amount of filler to be used. Some authorities advocate a fixed percentage or standard grading while others prefer the amount indicated by the lowest void test obtained with the mixtures of aggregate and filler.

With the usual method of combining the materials the aggregate and the filler are put into the mixing apparatus and agitated for a short time, the bituminous cement is then added and the whole mass thoroughly mixed.

When the dust is added in that manner it becomes merely a part of the aggregate and its real efficacy as a filler and the full value of the bituminous cement as a binding agent is never attained.

I have found that the foregoing procedure does not give the best results as the presence of the very fine material interferes with the proper coating of the coarse particles and requires an actual excess of the bituminous cement in order to properly bind the particles together.

It is well known that a mass of fine particles will take up or absorb much more liquid than an equal volume of coarse particles consequently when bituminous cement is added to an aggregate containing such fine material it is at once absorbed by the fine and the coarse particles do not become properly coated until sufficient has been added to thoroughly saturate the fine and leave an excess for the coarse. This usually results in the mass of fine material containing an excess of the cementing medium interspersed with the coarse particles not properly coated, with the result that segregation is apt to occur.

In the process herein described these difficulties are overcome, yielding a product in which the cementing medium is properly distributed throughout the mass. Maximum bonding strength is thus obtained with minimum proportion of bituminous cement, thus avoiding excessively rich bituminous mortar and correcting the tendency to segregate.

These results are obtained by dividing the dust free aggregate into two classes, the load bearing element consisting of ¼" and larger material and the mortar element consisting of all between the load bearing coarse particles and the finely divided filler or dust particles.

The load bearing element may, if desired, be divided into several sizes and recombined into definite proportions by weight in order to give better control to the mixture. This step while desirable is not essential and may be omitted. The mortar element for practical reasons is not sub-divided; it may be controlled however, to a certain extent by mixing sands, stone screenings, etc., in various proportions to give the desired grading or sieve tests according to methods now well known.

The method of preparing the mixture in accordance with the present invention may be described as follows:—

A definite proportion of the load bearing, coarse material is run into the mixer and bituminous cement in condition to flow freely is added in quantity sufficient to coat all the particles thoroughly and the mass constantly agitated until such result has been accomplished. In the meantime the desired proportion of mortar element is weighed or measured and then added to the bituminous coated coarse particles in the mixer—additional bituminous cement may then be added and the entire mass thoroughly mixed. As soon as this is done finely divided mineral matter or dust is added and agitation continued until it is well distributed throughout the mass.

The relative proportions of the coarse load bearing element and the fine mortar element most suitable for use with the materials available may be determined by methods now well known. The amount of bituminous cement must be determined by trial. In practice I have found that the best results are obtained with the load bearing element composed of a well graded mixture of particles from ¼" up to the maximum desired, in connection with a mortar element composed of particles ⅛" in size down to dust. After the coarse particles have been coated with bituminous cement as described above and the mortar element added thereto, sufficient bituminous cement should be added to bring the total bituminous cement of the mixture within the limits of 4% to 9%. The proper proportion of filler, the quantity being controlled by the amount of bituminous cement used in the mixture, is then added. The amount of filler may range from ⅜ the volume of the bituminous cement to an equal volume but in most cases filler equivalent in volume to one-half the volume of the bituminous cement (which is the approximate proportion combined with the mortar element) will suffice.

Bituminous cement as used in paving mixtures is a liquid and in order to get the proper binding action it is essential that the surface of the solid particles be thoroughly wetted by the liquid.

By adding the mortar element subsequent to the coating of the load bearing coarse particles and then adding filler subsequent to the coating of the particles of the mortar element there is no interference with the proper coating of the coarse particles or the particles of the mortar element by the presence of finer material.

This results in better distribution of the bituminous cement with increased cementing properties and with less tendency to segregate.

The dust or filler is also more effective as it is not merely a part of the aggregate but the fine particles actually fit in between the bitumen coated particles of the mortar element which in turn fits in between the bitumen coated coarse or load bearing particles.

The amount of filler added is gauged by the quantity of the bituminous cement used, but in mixtures of this type part of the cement coats the coarse particles and the mortar element is in effect a filler for that material, therefore, the amount of dust or finely divided filler required should be based upon the amount of the bituminous cement combined with the mortar element.

Under ordinary conditions this would be equal to approximately one half the volume of the bituminous cement used in the entire mixture.

There are occasions however, particularly where gravel is used as coarse aggregate in place of crushed stone and where bitumen of soft consistency is used the proportion of filler may be increased from approximately fifty (50) percent to seventy-five (75) or one hundred (100) percent of the volume of the bituminous cement used in the composition. This is due to the fact that with gravel a relatively larger proportion of mortar is used than with crushed stone so that a larger proportion of the cement in the mixture is combined in the mortar. Where soft bitumen is used the filler is also increased owing to the greater covering capacity of the soft cement.

Having now particularly described and ascertained the nature of my said invention, and in what manner the same is to be performed, I declare that what I claim is:—

1. The method of preparing bituminous paving compositions of the coarse aggregate type which consists in subdividing the aggregate into filler material and into separate elements respectively of particles of different degrees of coarseness, then thoroughly coating the particles of the coarser element with bituminous cement, then adding the other element, and finally adding thereto the filler material.

2. The method of preparing bituminous paving compositions of the coarse aggregate type which comprises subdividing the aggregate into a filler material and separate elements respectively of different degrees of coarseness, then thoroughly coating the particles of the coarser element with bituminous cement, then adding the other element with additional cement, and finally adding the filler material.

3. In the preparation of the bituminous paving compositions of the coarse aggregate type the method of subdividing the aggregate into load bearing and mortar elements and filler material, thoroughly coating the load bearing element while substantially free from fine material with bituminous cement, then adding the mortar element and additional cement where required and finally adding thereto the filler material, then agitating the mass to effect proper distribution substantially as described.

4. The method of preparing bituminous paving compositions of the coarse aggregate type which consist in coating the load bearing elements with a liquid bituminous cementing medium prior to the addition of the mortar element then introducing the mortar element and more of the cementing medium, finally adding the filler material and agitating the mass to effect proper distribution of the filler material substantially as described.

5. The method of preparing bituminous paving composition of the coarse aggregate type which consists in coating well graded mineral particles from ¼" in size up to the desired maximum with bituminous cement of any desired consistency, then adding thereto a predetermined proportion of dust free, graded material ⅛" and smaller in size, then adding more bituminous cement sufficient in quantity to give desired bituminous content in the mixture and finally adding thereto a volume of mineral dust, substantially all of which passes 50 mesh sieve and 60% or more passes 200 mesh sieve, equal to one-half the volume of the bituminous cement and agitating the mass to effect distribution of the mineral dust substantially as described.

6. The method of preparing bituminous paving composition of the coarse aggregate type which consists in combining a portion of the aggregate passing an 8 mesh screen, but substantially free from dust, with coarser particles previously coated with bituminous cement adding more cement to increase the bituminous content of the mixture and finally adding finely divided mineral matter and agitating the mass to effect proper distribution of the mineral element substantially as described.

7. The method of preparing bituminous paving composition of the coarse aggregate type which consists in commingling particles of crushed stone, gravel or slag ¼" and larger in size with bituminous cement slightly in excess of the amount required to coat the particles then adding thereto a predetermined proportion of dust free sand or stone screenings passing 8 mesh and finer screens and bituminous cement slightly less in quantity than would be required for this material if used alone, mixing the mass thoroughly and finally introducing finely divided filler material substantially all of which passes 50 mesh screen and at least 60% passes 200 mesh screen and agitating the mass to secure proper distribution substantially as described.

8. The method of preparing bituminous paving composition of coarse aggregate type which comprises commingling well graded crushed stone or gravel ¼" and larger in size previously coated with bituminous cement, with the dust free sand, stone screenings or the like all of which passes an 8 mesh screen, then adding sufficient bituminous cement to bring total in the mixture to within the limits of 4.5 to 8% then adding finely divided mineral matter, substantially all of which passes 50 mesh screen and at least 60% passes 200 mesh screen in an amount equal in volume to ⅜ to ¾ the volume of the bituminous cement used in the mixture and agitating the mass to effect proper distribution substantially as described.

In testimony whereof I affix my signature.

EDWIN C. WALLACE.